(12) United States Patent
Robertson et al.

(10) Patent No.: US 12,551,153 B2
(45) Date of Patent: Feb. 17, 2026

(54) IMPLANTABLE MEDICAL DEVICE WITH MULTI-SIDED HEADER ELECTRODE

(71) Applicant: Pacesetter, Inc., Sylmar, CA (US)

(72) Inventors: Alex Robertson, Los Angeles, CA (US); Arees Garabed, North Hills, CA (US); Leyla Sabet, Los Angeles, CA (US); Chunlan Jiang, Northridge, CA (US); Eric Somogyi, Simi Valley, CA (US)

(73) Assignee: Pacesetter, Inc., Sylmar (CA)

( * ) Notice: Subject to any disclaimer, the term of this patent is extended or adjusted under 35 U.S.C. 154(b) by 734 days.

(21) Appl. No.: 17/659,715

(22) Filed: Apr. 19, 2022

(65) Prior Publication Data

US 2022/0361795 A1   Nov. 17, 2022

Related U.S. Application Data

(60) Provisional application No. 63/193,492, filed on May 26, 2021, provisional application No. 63/189,312, filed on May 17, 2021.

(51) Int. Cl.
| | |
|---|---|
| *A61B 5/00* | (2006.01) |
| *A61B 5/29* | (2021.01) |
| *A61B 5/361* | (2021.01) |
| *H01Q 1/40* | (2006.01) |
| *B29C 45/14* | (2006.01) |
| *B29L 31/00* | (2006.01) |
| *B29L 31/34* | (2006.01) |
| *H01Q 1/27* | (2006.01) |

(52) U.S. Cl.
CPC ............. *A61B 5/29* (2021.01); *A61B 5/361* (2021.01); *H01Q 1/40* (2013.01); *A61B 2562/12* (2013.01); *B29C 45/14639* (2013.01); *B29K 2995/0006* (2013.01); *B29L 2031/3456* (2013.01); *B29L 2031/753* (2013.01); *H01Q 1/273* (2013.01)

(58) Field of Classification Search
None
See application file for complete search history.

(56) References Cited

U.S. PATENT DOCUMENTS

| | | |
|---|---|---|
| 10,172,559 B2 | 1/2019 | Lim et al. |
| 2014/0135882 A1 | 5/2014 | Prasannakumar et al. |
| (Continued) | | |

OTHER PUBLICATIONS

Extended European Search Report for corresponding EP Application No. 22157696.0-1126 dated Jul. 27, 2022 (7 pages).

*Primary Examiner* — Sana Sahand
(74) *Attorney, Agent, or Firm* — Dean D. Small; Carroll, Hoette & Butscher, LLC

(57) ABSTRACT

An implantable medical device includes a header configured to be mounted to an end of a device housing that contains an electronics module therein. The header includes an antenna, a sensing electrode, and a header body that at least partially surrounds the antenna and the sensing electrode. The sensing electrode includes a first body portion, a second body portion, and a bridge portion that mechanically and electrically connects the first and second body portions. The first body portion is at least partially exposed to an external environment along a first side of the header, and the second body portion is at least partially exposed to the external environment along a second side of the header that is different from the first side.

17 Claims, 10 Drawing Sheets

(56) References Cited

U.S. PATENT DOCUMENTS

2016/0310031 A1* 10/2016 Sarkar .................... A61B 5/686
2017/0325741 A1    11/2017 Lim et al.
2019/0232066 A1*  8/2019 Lim ..................... A61N 1/3754

* cited by examiner

IMPLANTABLE MEDICAL DEVICE WITH MULTI-SIDED HEADER ELECTRODE

CROSS-REFERENCE TO RELATED APPLICATIONS

This application claims priority to U.S. Provisional Application No. 63/189,312, filed May 17, 2021, and to U.S. Provisional Application No. 63/193,492, filed May 26, 2021. Both provisional applications are titled "IMPLANTABLE MEDICAL DEVICE WITH MULTI-SIDED HEADER ELECTRODE." The subject matter of each of the two provisional applications is expressly incorporated herein by reference in its entirety.

BACKGROUND

Embodiments of the present disclosure generally relate to implantable medical devices and methods, and more particularly to implantable medical devices having an electrode and antenna provided in a ceramic header.

Various types of implantable devices are utilized today for monitoring physiologic activity and potentially delivering therapy. Some types of implantable medical devices are "leadless" and instead include electrodes directly on the housing to sense and deliver therapy. One example of an implantable medical device (IMD), that does not provide therapy, is an implantable cardiac monitor or implantable cardiac monitoring (ICM) device, which is very small in size as compared to other implantable medical devices such as pacemakers, implantable cardioverter defibrillators, cardiac rhythm management devices and the like. The ICM device includes a header that holds an antenna for wireless communications (e.g., an RF or Bluetooth Low Energy antenna). The header also houses a sensing electrode to monitor physiologic activity of the patient. The header may be pre-formed and then attached to an end of a housing or case of the ICM device.

However, an opportunity remains to improve upon conventional ICM device designs. For example, the small size enables the ICM device to move, such as rotate, within a subcutaneous pocket of the patient, which changes the position of the sensing electrode within the header relative to the body of the patient. Shifts in the position and/or orientation of the ICM device relative to the patient body can affect the sensitivity of the sensing electrode to cardiac signals. Cardiac monitoring performance may suffer if the sensitivity changes, and the ICM device may require recalibration. Furthermore, the movement may cause the header electrode to at least periodically separate from patient tissue with which the header electrode was in persistent contact, and the loss of contact may significantly diminish cardiac sensing capability. The ICM device may falsely interpret the lack of cardiac signals, when the electrode is separated from the tissue, as a period of no intrinsic heartbeat in the patient. Even if such false pause episode does not occur, the diminished sensing capability could reduce the quality of the sensing data generated by the ICM device, such as the quality of R wave sensing in an electrogram (EGM).

A need remains for an implantable medical device that affords reliable cardiac sensing and sensitivity even as the posture of the patient changes and the implantable medical device moves in the subcutaneous pocket within the patient.

SUMMARY

In one or more embodiments, an implantable medical device is provided that includes a header configured to be mounted to an end of a device housing that contains an electronics module therein. The header includes an antenna, a sensing electrode, and a header body that at least partially surrounds the antenna and the sensing electrode. The sensing electrode includes a first body portion, a second body portion, and a bridge portion that mechanically and electrically connects the first and second body portions. The first body portion is at least partially exposed to an external environment along a first side of the header, and the second body portion is at least partially exposed to the external environment along a second side of the header that is different from the first side.

Optionally, the first side of the header is opposite the second side of the header. In one example, the first side of the header is defined in part by the header body and in part by the first body portion of the sensing electrode. The part of the first side defined by the first body portion may protrude outward relative to the part defined by the header body. Optionally, the first body portion has a planar outer surface that is exposed to the external environment, and the second body portion has a planar outer surface that is exposed to the external environment. The planar outer surfaces of the first and second body portions may extend in parallel planes. Optionally, the header includes a curved distal surface extending along a thickness of the header from the first side to the second side. Respective distal edges of the first body portion and the second body portion may be arcuate and may conform to a shape of the curved distal surface.

Optionally, the header body comprises a dielectric material in which the antenna and the sensing electrode are embedded. Optionally, each of the first body portion and the second body portion has a respective flange and a platform that is raised relative to the flange. The header body may envelop the flange and an outer surface of the platform may project from the header body. Perimeter edges of the platform may be beveled or rounded. Optionally, each of the first body portion and the second body portion has bent tabs projecting into an interior of the header. The bent tabs may be encased within the header body to secure the first and second body portions in place within the header. Optionally, the header body defines a suture opening that extends through an entire thickness of the header body.

Optionally, the implantable medical device also includes a feedthrough assembly that abuts a mounting end of the header at an interface and attaches to the end of the device housing. The header body may comprise a dielectric material that covers the interface and surrounds at least a segment of the feedthrough assembly. Optionally, the bridge portion of the sensing electrode is mechanically attached to a conductor to electrically connect the conductor to the sensing electrode. The conductor may project from a mounding end of the header through the end of the device housing to the electronics module. Optionally, the sensing electrode is a monolithic structure, and the first and second body portions are integrally connected to different ends of the bridge portion.

In one or more embodiments, an implantable medical device is provided that includes a header configured to be mounted to an end of a device housing that contains an electronics module therein. The header includes an antenna, a sensing electrode, and a header body. The sensing electrode includes a first body portion, a second body portion, and a bridge portion that mechanically and electrically connects the first and second body portions. The bridge portion is disposed within an interior of the header body. Each of the first body portion and the second body portion has a respective flange and a respective platform that is raised relative to the flange. The header body envelops the flanges of both the first and second body portions. The platform of the first body portion protrudes outward beyond the header body along a first side of the header, and an outer surface of the platform of the first body portion is exposed to an external environment. The platform of the second body portion protrudes outward beyond the header body along a second side of the header, and an outer surface of the platform of the second body portion is exposed to the external environment.

Optionally, the first side of the header is opposite the second side. Optionally, the sensing electrode is a monolithic structure, and the first body portion and the second body portion are integrally connected to different ends of the bridge portion. In an example, the implantable medical device also includes a feedthrough assembly that abuts a mounting end of the header at an interface and attaches to the end of the device housing. The header body may comprise a dielectric material that covers the interface and surrounds at least a segment of the feedthrough assembly.

In one or more embodiments, a method to provide an implantable medical device is presented. The method includes providing a header by inserting a sensing electrode and an antenna within a mold. The sensing electrode includes a first body portion, a second body portion, and a bridge portion that mechanically and electrically connects the first and second body portions. The header is also provided by flowing a dielectric material into the mold to at least partially surround the sensing electrode and the antenna and form a header body of the header upon solidification of the dielectric material. The sensing electrode is inserted in the mold, and the dielectric material is flowed into the mold such that the first body portion is at least partially exposed to an external environment along a first side of the header, and the second body portion is at least partially exposed to the external environment along a second side of the header that is different from the first side. The header is also provided by removing the header body with the sensing electrode and the antenna from the mold. The method also includes mounting the header to an end of a device housing that contains an electronics module therein.

Optionally, providing the header includes mechanically securing conductors of a feedthrough assembly to the bridge portion of the sensing electrode and the antenna, and inserting a base of the feedthrough assembly at least partially into the mold prior to flowing the dielectric material into the mold. The dielectric material may be flowed into the mold to at least partially surround the base of the feedthrough assembly for forming the header body in-situ on the base.

Optionally, each of the first body portion and the second body portion has a respective flange and a platform that is raised relative to the flange. The dielectric material may be flowed into the mold to envelop the flange without enveloping the platform such that an outer surface of the platform projects from the header body.

DETAILED DESCRIPTION

Figure 1A:
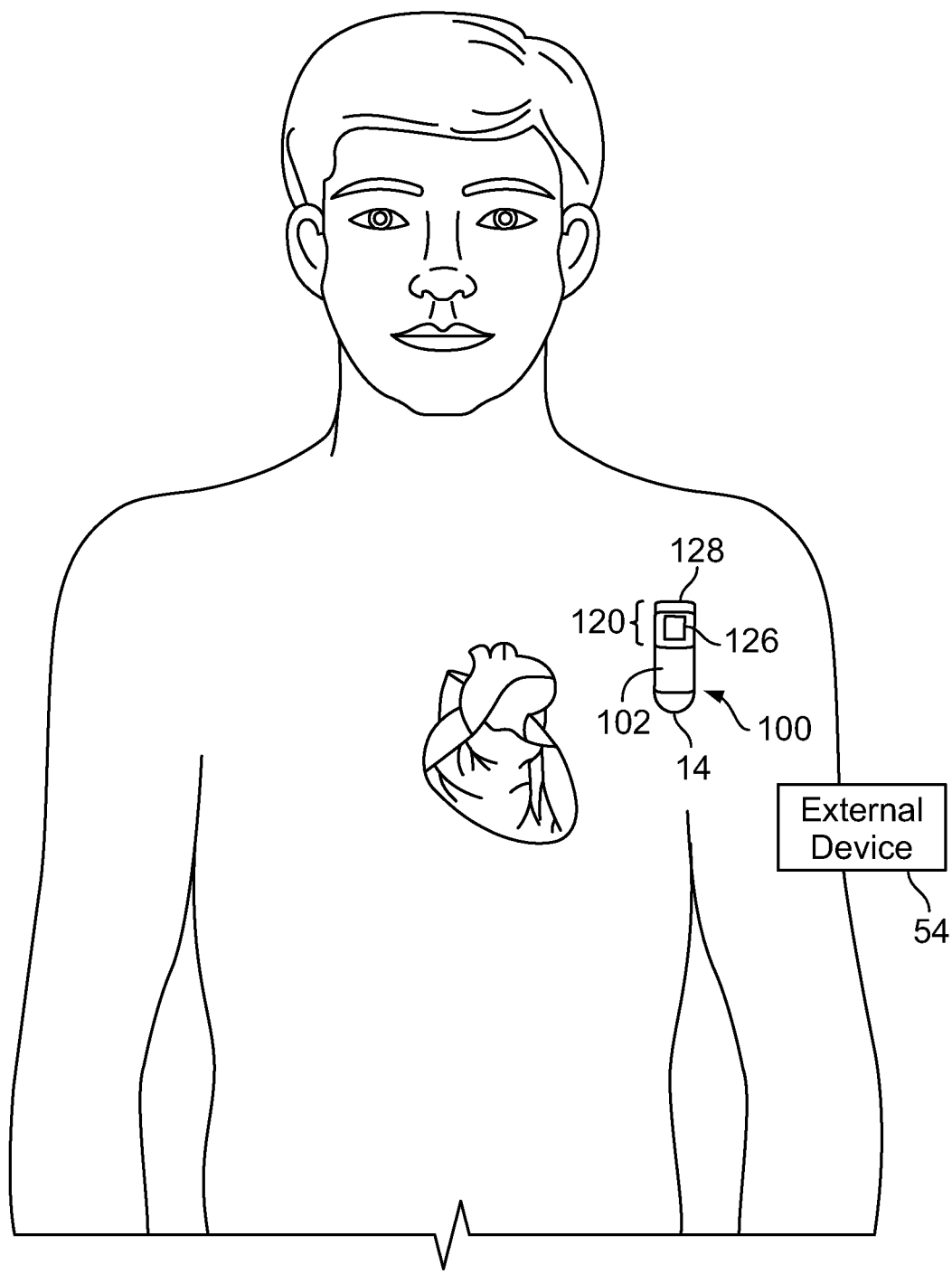
FIG. 1A illustrates an implantable medical device (IMD) intended for subcutaneous implantation at a site near the heart in accordance with embodiments herein.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments may be implemented in connection with one or more implantable medical devices (IMDs). Non-limiting examples of IMDs include one or more of neurostimulator devices, implantable leadless monitoring and/or therapy devices, and/or alternative implantable medical devices. For example, the IMD may represent a cardiac monitoring device, leadless pacemaker, cardioverter, cardiac rhythm management device, defibrillator, neurostimulator, and the like. For example, the IMD may include one or more structural and/or functional aspects of the device(s) described in U.S. Pat. No. 9,333,351 "Neurostimulation Method And System To Treat Apnea" and U.S. Pat. No. 9,044,610 "System And Methods For Providing A Distributed Virtual Stimulation Cathode For Use With An Implantable Neurostimulation System", which are hereby incorporated by reference. Additionally or alternatively, the IMD may include one or more structural and/or functional aspects of the device(s) described in U.S. Pat. No. 9,216,285 "Leadless Implantable Medical Device Having Removable And Fixed Components" and U.S. Pat. No. 8,831,747 "Leadless Neurostimulation Device And Method Including The Same", which are hereby incorporated by reference. Additionally or alternatively, the IMD may include one or more structural and/or functional aspects of the device(s) described in U.S. Pat. No. 8,391,980 "Method And System For Identifying A Potential Lead Failure In An Implantable Medical Device" and U.S. Pat. No. 9,232,485 "System And Method For Selectively Communicating With An Implantable Medical Device", which are hereby incorporated by reference.

FIG. 1A illustrates an implantable medical device (IMD) 100 intended for subcutaneous implantation at a site near the heart. The IMD 100 may provide comprehensive safe diagnostic data reports including a summary of heart rate, in order to assist physicians in diagnosis and treatment of patient conditions. By way of example, reports may include episodal diagnostics for auto trigger events, episode duration, episode count, episode date/time stamp and heart rate histograms. The IMD 100 may be configured to be relatively small (e.g., between 2-10 cc in volume) which may, among other things, reduce risk of infection during implant procedure, afford the use of a small incision, afford the use of a smaller subcutaneous pocket and the like. The small footprint may also reduce implant time and introduce less change in body image for patients.

The IMD 100 provides a data storage option that is simple to configure to enable physicians to prioritize data based on individual patient conditions, to capture significant events and reduce risk that unexpected events are missed. The IMD 100 may have programmable pre- and post-trigger event storage. For example, the IMD 100 may be automatically activated to store 10-60 seconds of activity data prior to an event of interest and/or to store 10-60 seconds of post event activity. Optionally, the IMD 100 may afford patient triggered activation in which pre-event activity data is stored, as well as post event activity data (e.g., pre-event storage of 1-105 minutes and post-event storage of 30-60 seconds). Optionally, the IMD 100 may afford manual (patient triggered) or automatic activation for EGM storage. Optionally, the IMD 100 may afford additional programming options (e.g., asystole duration, bradycardia rate, tachycardia rate, tachycardia cycle count). The amount of EGM storage may vary based upon the size of the memory.

The IMD 100 includes a housing 102 that is joined to a header 120. At least one electrode 126 and an antenna 128 are provided in the header 120 as explained hereafter in accordance with embodiments herein. In accordance with embodiments herein, a header configuration is provided which includes a multi-sided electrode 126. Multi-sided in this case refers to a single electrode 126 with multiple portions that extend along multiple different sides of the header 120 and are exposed to the tissue of the patient along each the sides. In a non-limiting example, a single electrode 126 may have a first body portion exposed to the tissue of the patient along a first side of the header 120 and a second body portion exposed to the patient tissue along a second side of the header 120 that is opposite the first side, such that the electrode 126 is effectively dual-sided with respect to the header 120. The multi-sided electrode header configuration is provided to enhance and increase the contact surface area of the electrode 126 with tissue, relative to electrodes that are only exposed to tissue along one side. Increase the amount of surface area of the electrode 126 in contact with the tissue reduces the likelihood of the electrode 126 losing contact with the tissue and makes the IMD 100 less sensitive to postural changes of the patient. In effect, the IMD 100 becomes more robust and reliable, and the data generated is less variable.

The housing 102 includes one or more electrodes 14 that are provided on the housing 102 distal from the header 120. The electrode(s) 14 may be located in various locations on the housing 102. For example, when separate housing portions are provide for the electronics module and the battery, one or more electrodes may be located on the battery (e.g., the battery housing). Numerous configurations of electrode arrangements are possible.

The housing 102 includes various other components such as sensing electronics for receiving signals from the electrodes, a microprocessor for processing the signals in accordance with algorithms (e.g., an atrial fibrillation (AF) detection algorithm), a memory for temporary storage of electrograms, a device memory for long-term storage of electrograms upon certain triggering events, such as AF detection, sensors for detecting patient activity and a battery for powering components.

The IMD device 100 senses far field, subcutaneous electrograms, processes the electrograms to detect arrhythmias and automatically records the electrograms in memory for subsequent transmission through the antenna 128 to an external device 54. Electrogram processing and arrhythmia detection is provided for, at least in part, by algorithms embodied in the microprocessor. In one configuration, the monitoring device is operative to detect AF.

Figure 1B:
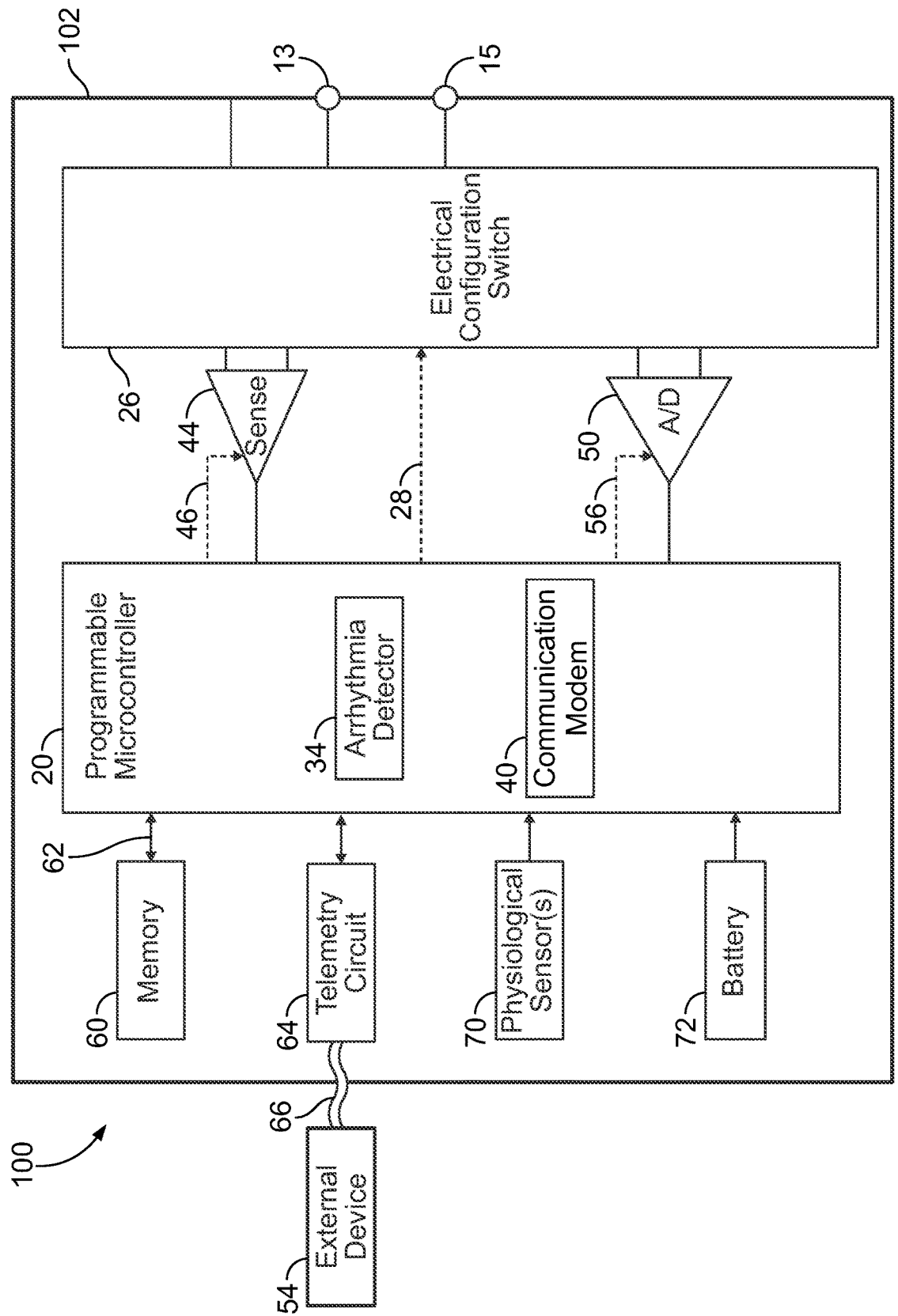
FIG. 1B shows a block diagram of an exemplary IMD that is configured to be implanted into the patient in accordance with embodiments herein.

FIG. 1B shows a block diagram of an exemplary IMD 100 that is configured to be implanted into the patient. The IMD 100 may be implemented to monitor ventricular activity alone, or both ventricular and atrial activity through sensing circuitry. The IMD 100 has a device housing 102 to hold the electronic/computing components. The housing 102 (which is often referred to as the "can", "case", "encasing", or "case electrode") may be programmable to act as an electrode for certain sensing modes. The housing 102 further includes a connector (not shown) with at least one terminal 13 and preferably a second terminal 15. The terminals 13, 15 may be coupled to sensing electrodes that are provided upon or immediately adjacent the housing 102. For example, the terminal 13 may be coupled to the sensing electrode 126 in the header 120 (shown in FIG. 1A). The other terminal 15 may be coupled to a sensing electrode integrated into the device housing 102 or may be coupled to the housing itself which can operate as an electrode when formed of an electrically conductive material, such as a metal or metal alloy. Optionally, more than two terminals 13, 15 may be provided in order to support more than two sensing electrodes to support a true bipolar sensing scheme using the housing as a reference electrode.

In at least some embodiments, the IMD 100 is configured to be placed subcutaneously utilizing a minimally invasive approach. Subcutaneous electrodes are provided on the IMD 100 to simplify the implant procedure and eliminate a need for a transvenous lead system. For example, the IMD 100 may be leadless, such that the header 120 does not have any ports for connecting to leads. The sensing electrodes may be located on opposite sides of the device and designed to provide robust episode detection through consistent contact at a sensor—tissue interface. The IMD 100 may be configured to be activated by the patient or automatically activated, in connection with recording subcutaneous ECG signals.

The IMD 100 includes a programmable microcontroller 20 that controls various operations of the IMD 100, including cardiac monitoring. Microcontroller 20 includes a microprocessor (or equivalent control circuitry), RAM and/or ROM memory, logic and timing circuitry, state machine circuitry, and I/O circuitry. The microcontroller 20 also performs the operations described herein in connection with collecting cardiac activity data and analyzing the cardiac activity data to identify episodes.

A switch 26 is optionally provided to allow selection of different electrode configurations under the control of the microcontroller 20. The electrode configuration switch 26 may include multiple switches for connecting the desired electrodes to the appropriate I/O circuits, thereby facilitating electrode programmability. For example, the switch 26 may be utilized to select between electrodes 126 provided on opposite sides of the housing 102, such as based upon the orientation of the IMD 100 relative to a physiologic area of interest. The switch 26 is controlled by a control signal 28 from the microcontroller 20. Optionally, the switch 26 may be omitted and the I/O circuits directly connected to the housing electrode and a second electrode.

Microcontroller 20 includes an arrhythmia detector 34. The arrhythmia detector 34 is configured to analyze cardiac activity data to identify potential AF episodes as well as other arrhythmias (e.g., Tachycardias, Bradycardias, Asystole, etc.). By way of example, the arrhythmia detector 34 may implement an AF detection algorithm as described in U.S. Pat. No. 8,135,456, the complete subject matter of which is incorporated herein by reference. In accordance with at least some embodiments, when a potential AF episode is detected, the detector is utilized to determine whether the episode is in fact an AF episode or instead another episode. Although not shown, the microcontroller 20 may further include other dedicated circuitry and/or firmware/software components that assist in monitoring various conditions of the patient's heart and managing pacing therapies.

The IMD 100 is further equipped with a communication modem (modulator/demodulator) 40 to enable wireless communication. In one implementation, the communication modem 40 uses high frequency modulation, for example using RF, Bluetooth, Bluetooth Low Energy and other telemetry protocols. The signals are transmitted in a high frequency range and will travel through the body tissue in fluids without stimulating the heart or being felt by the patient. The communication modem 40 may be implemented in hardware as part of the microcontroller 20, or as software/firmware instructions programmed into and executed by the microcontroller 20. Alternatively, the modem 40 may reside separately from the microcontroller as a standalone component. The modem 40 facilitates data retrieval from a remote monitoring network. The modem 40 enables timely and accurate data transfer directly from the patient to an electronic device utilized by a physician.

The IMD 100 further includes an analog-to-digital A/D data acquisition system (DAS) 50 coupled to one or more electrodes via the switch 26 to sample cardiac signals across any pair of desired electrodes. The DAS 50 is configured to acquire cardiac electrogram (EGM) signals, convert the raw analog data into digital data, and store the digital data for later processing and/or telemetric transmission to an external device 54 (e.g., a programmer, local transceiver, or a diagnostic system analyzer). The DAS 50 is controlled by a control signal 56 from the microcontroller 20. The EGM signals are utilized as the cardiac activity data that is analyzed for potential episodes.

By way of example, the external device 54 may represent a portable smartphone, tablet device, bedside monitor installed in a patient's home and the like. The external device 54 is utilized to communicate with the IMD 100 while the patient is at work, home, in bed or asleep. The external device 54 may be a programmer used in the clinic to interrogate the device, retrieve data and program detection criteria and other features. The external device 54 may be a device that can be coupled over a network (e.g., the Internet) to a remote monitoring service, medical network and the like. The external device 54 facilitates access by physicians to patient data as well as permitting the physician to review real-time ECG signals while being collected by the IMD 100.

The IMD 100 includes sensing circuitry 44 selectively coupled to one or more electrodes 126 that perform sensing operations, through the switch 26 to detect cardiac activity data indicative of cardiac activity. The sensing circuitry 44 may include dedicated sense amplifiers, multiplexed amplifiers, or shared amplifiers. It may further employ one or more low power, precision amplifiers with programmable gain and/or automatic gain control, bandpass filtering, and threshold detection circuit to selectively sense the cardiac signal of interest. In one embodiment, switch 26 may be used to determine the sensing polarity of the cardiac signal by selectively closing the appropriate switches.

The output of the sensing circuitry 44 is connected to the microcontroller 20 which, in turn, determines when to store the cardiac activity data (digitized by the A/D data acquisition system 50) in the memory 60. For example, the microcontroller 20 may only store the cardiac activity data (from the A/D data acquisition system 50) in the memory 60 when a potential AF episode is detected. The sensing circuitry 44 receives a control signal 46 from the microcontroller 20 for purposes of controlling the gain, threshold, polarization charge removal circuitry (not shown), and the timing of any blocking circuitry (not shown) coupled to the inputs of the sensing circuitry.

In the example of FIG. 1B, a single sensing circuit 44 is illustrated. Optionally, the IMD 100 may include multiple sensing circuits, similar to sensing circuit 44, where each sensing circuit is coupled to two or more electrodes and controlled by the microcontroller 20 to sense electrical activity detected at the corresponding two or more electrodes. The sensing circuit 44 may operate in a unipolar sensing configuration (e.g., housing 102 to electrode) or in a bipolar sensing configuration (e.g., between electrodes referenced to the housing electrode). Optionally, the sensing circuit 44 may be removed entirely and the microcontroller 20 perform the operations described herein based upon the EGM signals from the A/D data acquisition system 50 directly coupled to the electrodes 126.

The microcontroller 20 is coupled to a memory 60 by a suitable data/address bus 62. The programmable operating parameters used by the microcontroller 20 are stored in memory 60 and used to customize the operation of the IMD 100 to suit the needs of a particular patient. Such operating parameters define, for example, detection rate thresholds, sensitivity, automatic features, arrhythmia detection criteria, activity sensing or other physiological sensors, and electrode polarity, etc.

In addition, the memory 60 stores the cardiac activity data, as well as the markers and other data content associated with detection of episodes. The operating parameters of the IMD 100 may be non-invasively programmed into the memory 60 through a telemetry circuit 64 in telemetric communication via communication link 66 with the external device 54. The telemetry circuit 64 allows intracardiac electrograms and status information relating to the operation of the IMD 100 (as contained in the microcontroller 20 or memory 60) to be sent to the external device 54 through the established communication link 66. In accordance with embodiments herein, the telemetry circuit 64 conveys the cardiac activity data, markers and other information related to AF episodes.

The IMD 100 may further include magnet detection circuitry (not shown), coupled to the microcontroller 20, to detect when a magnet is placed over the IMD. A magnet may be used by a clinician to perform various test functions of the IMD 100 102 and/or to signal the microcontroller 20 that the external device 54 is in place to receive or transmit data to the microcontroller 20 through the telemetry circuits 64.

The IMD 100 can further include one or more physiologic sensors 70. Such sensors are commonly referred to (in the pacemaker arts) as "rate-responsive" or "exercise" sensors. The physiological sensor 70 may further be used to detect changes in the physiological condition of the heart, or diurnal changes in activity (e.g., detecting sleep and wake states). Signals generated by the physiological sensors 70 are passed to the microcontroller 20 for analysis and optional storage in the memory 60 in connection with the cardiac activity data, markers, episode information and the like. While shown as being included within the IMD 100, the physiologic sensor(s) 70 may be external to the IMD 100, yet still be implanted within or carried by the patient. Examples of physiologic sensors might include sensors that, for example, activity, temperature, sense respiration rate, pH of blood, ventricular gradient, activity, position/posture, minute ventilation (MV), and so forth.

A battery 72 provides operating power to all of the components in the IMD 100. The battery 72 is capable of operating at low current drains for long periods of time. The battery 72 also desirably has a predictable discharge characteristic so that elective replacement time can be detected. As one example, the unit 102 employs lithium/silver vanadium oxide batteries. The battery 72 may afford various periods of longevity (e.g., three years or more of device monitoring). In alternate embodiments, the battery 72 could be a secondary battery (e.g., rechargeable). See for example, U.S. Pat. No. 7,294,108, Cardiac Event Microrecorder And Method For Implanting Same, which is hereby incorporated by reference.

Figure 2:
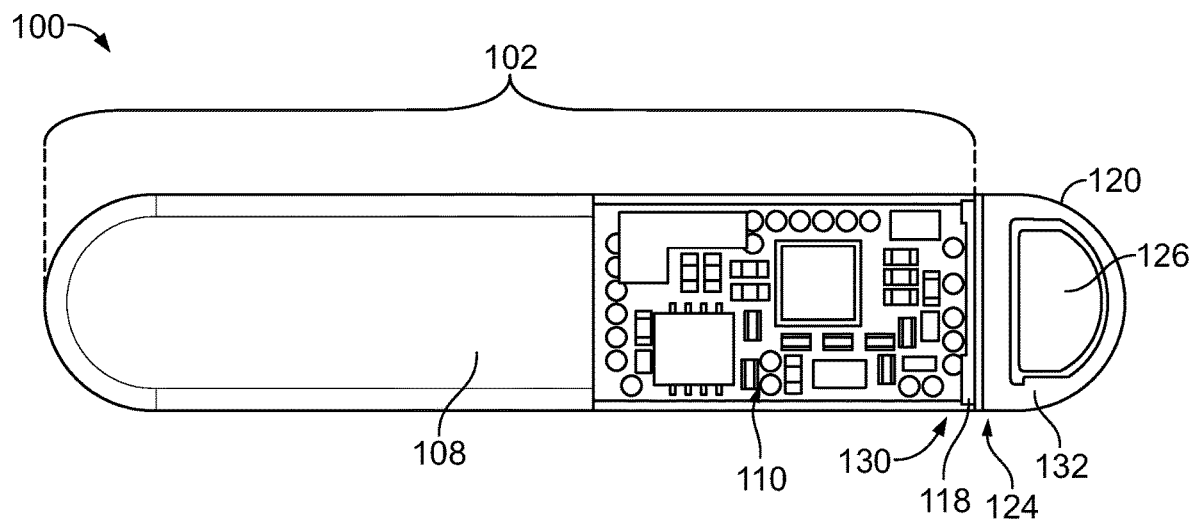
FIG. 2 illustrates a plan view of the IMD according to an embodiment.

FIG. 2 illustrates a plan view of the IMD 100 according to an embodiment. The header 120 is mounted to an end (e.g., a header end) 130 of the device housing 102 via a feedthrough assembly 118. The IMD 100 has a small form factor with an elongated shape. The IMD 100 has curved ends and rounded or beveled edges to avoid snagging during implantation or damaging tissue when disposed within the sub-cutaneous pocket of the patient.

The device housing 102 may include top and bottom case portions, or shells, that join with one another to enclose a battery 108 and an electronics module 110 (also referred to as a hybrid circuit). One of the case portions may be omitted in FIG. 2 to show the battery 108 and the electronics module 110 within an internal cavity of the device housing 102. The battery 108 may be the battery 72 shown in FIG. 1B, and the electronics module 110 may include the components described above in connection with FIG. 1B, and/or as described in any of the patents or published applications incorporated herein by reference. For example, the electronics module 110 includes sensing circuitry that receives EGM signals from the electrodes of the IMD 100, such as the sensing electrode 126 on the header 120. The sensing circuitry may analyze and process the EGM signals, and may generate messages to communicate the EGM signals, or data based on the EGM signals, via the antenna 128 (shown in FIG. 1) to the external device 54. In the illustrated embodiment, the antenna 128 is disposed within an interior volume of a header body 132 of the header 120. The header body 132 represents a solid (non-hollow) body formed of a generally homogeneous dielectric (e.g., electrically insulative) material.

The header 120 has a mounting end 124 configured to be mounted to the feedthrough assembly 118. The sensing electrode 126 and the antenna 128 of the header 120 are electrically connected to the electronics module 110 via electrically conductive elements such as wires, traces, pins, receptacle connectors, plug connectors, and/or the like that project across the mounting end 124. At least some of the conductive elements traverse the feedthrough assembly 118 at the interface between the header 120 and the device housing 102. In an alternative embodiment, the IMD 100 does not have a feedthrough assembly, and the mounting end 124 of the header 120 mounts directly to the end 130 of the housing 102.

The assembly of the IMD 100 generally may include electrically connecting the battery 108 to the electronics module 110 to power the electronics module 110. The battery 108 and the electronics module 110 may be loaded into one of the housing case portions or shells. The conductive elements held by the feedthrough assembly 118, such as wires, pins, or connectors, may be electrically connected to the electronics module 110 as well. The header 120 is mounted to the feedthrough assembly 118 in a way that includes electrically connecting the sensing electrode 126 and the antenna 120 to the conductive elements of the feedthrough assembly 118. The two case portions of the housing 102 may be coupled together to enclose the battery 108 and the electronics module 110. The order of these previous steps may be modified. Once the IMD device 100 is coupled together, the interfaces between the case portions of the housing 102 and the interface between the header 120 and the housing 102 at the feedthrough assembly 118 are sealed. For example, at least one of the interfaces may be welded, filled with a sealant, bonded, or the like to hermetically seal the interior components of the IMD 100 from the organic tissues and fluids of the patient that form the external environment.

Figure 3:
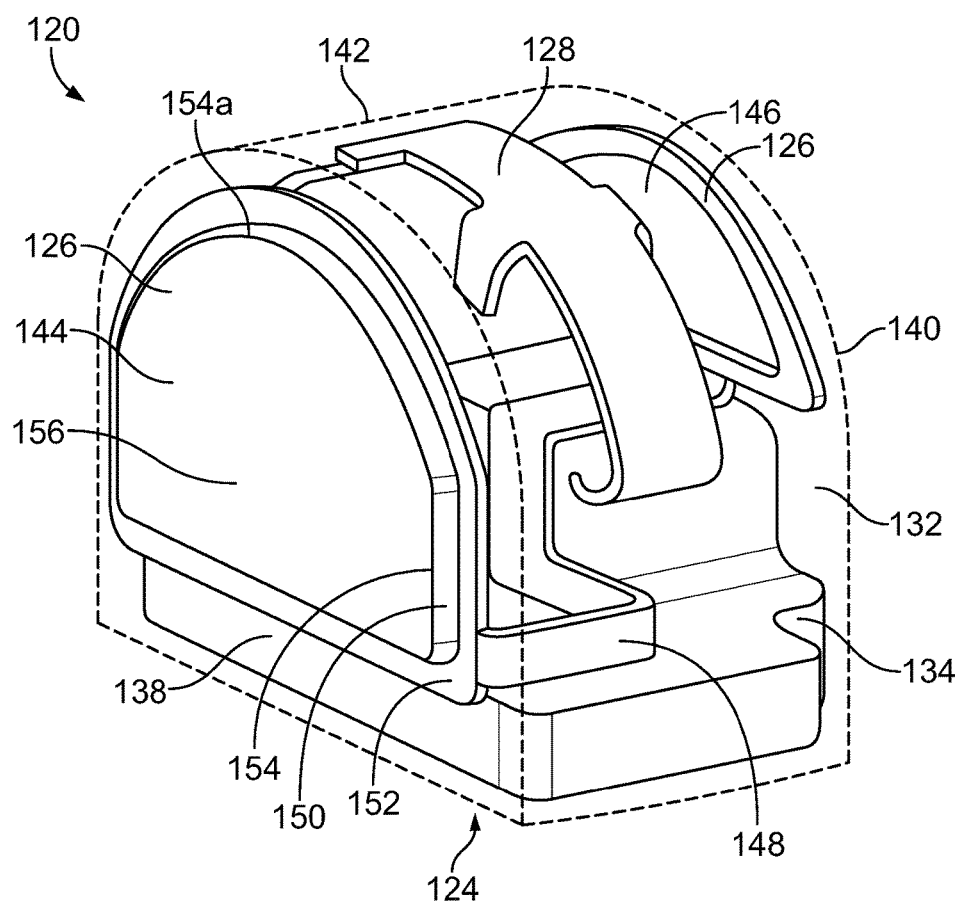
FIG. 3 is a perspective view of a header of the IMD according to a first embodiment.

FIG. 3 is a perspective view of the header 120 according to a first embodiment. The header 120 includes the sensing electrode 126, the antenna 128, and the header body 132. In the illustrated embodiment, the header 120 also includes a backfill or potting material 134. The backfill material 134 is applied after the electrode 126 and the antenna 128 are electrically connected to corresponding conductive elements of the feedthrough assembly 118 or device housing 102 to fill in the open cavity within the header body 132 in which the electrical components are connected. The header body 132 at least partially surrounds the sensing electrode 126 and the antenna 128. The header body 132 is shown in phantom in FIG. 3 to show the components within the interior volume of the header body 132.

The header 120 has multiple sides including a first face 138, a second face 140, and a curved distal surface 142 that extends along a thickness of the header 120 from the first face 138 to the second face 140. The header 120 extends from a mounting end 124 of the header 120 to the curved distal surface 142. For example, both the first face 138 and the second face 140 extend from the mounting end 124 to the curved distal surface 142. The first face 138 is opposite the second face 140. The first face 138, the second face 140, and the distal surface 142 represent first, second, and third sides of the header 120. The mounting end 124 represents a fourth side of the header 120. The header 120 may have additional sides depending on the contour of the curved distal surface 142. For example, fifth and sixth sides of the header 120 may be surfaces located between the first and second faces 138, 140 and extending from the mounting end 124 to the curved distal surface 142. The multiple sides of the header 120 merge with one another along beveled or rounded edges to form a smooth overall contour for the header 120.

Figure 4:
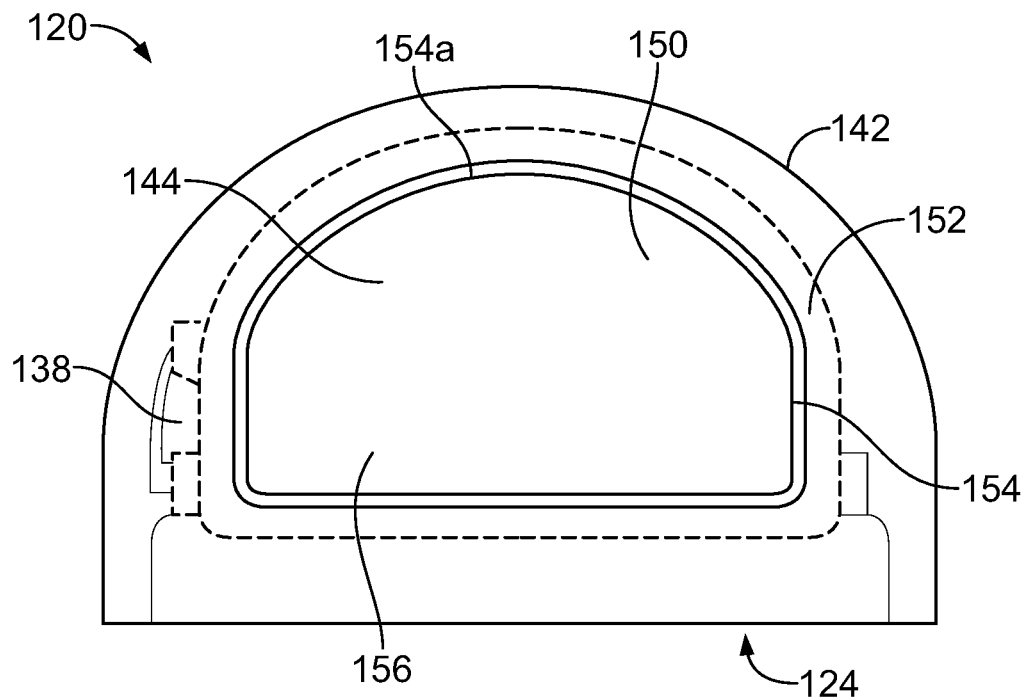
FIG. 4 is a first elevation view of the header in FIG. 3 showing a first face of the header.
Figure 5:
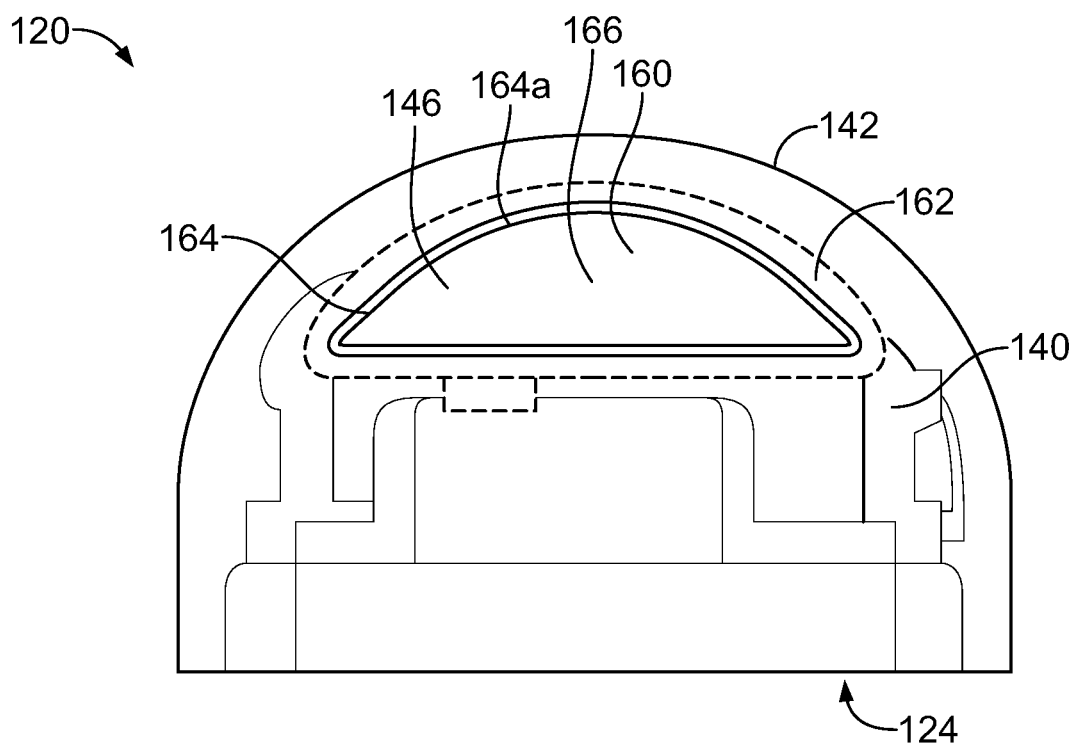
FIG. 5 is a second elevation view of the header in FIG. 3 showing a second face of the header.
Figure 6:
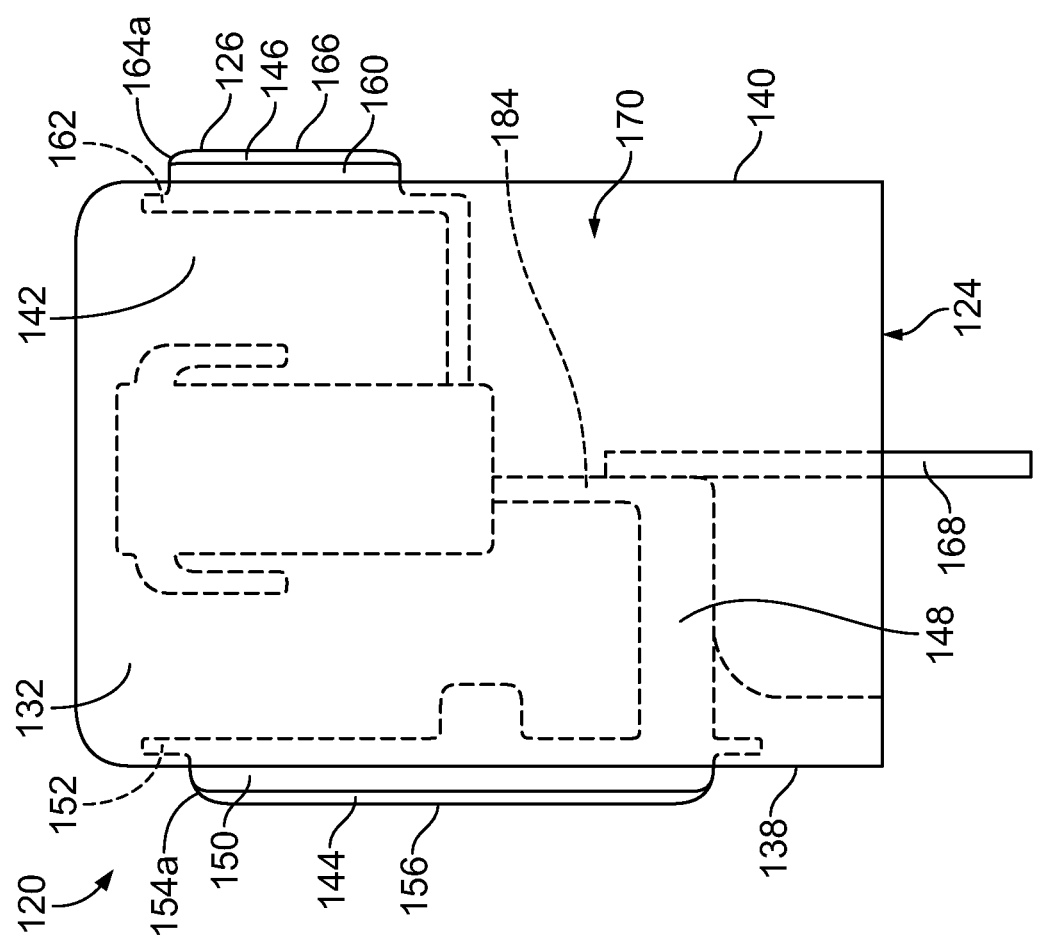
FIG. 6 is a third elevation view of the header in FIG. 3 in profile showing a curved distal surface of the header.

FIG. 4 is a first elevation view of the header 120 in FIG. 3 showing the first side or face 138. FIG. 5 is a second elevation view of the header 120 in FIG. 3 showing the second side or face 140. FIG. 6 is a third elevation view of the header 120 in FIG. 3 in profile showing the curved distal surface 142. In FIG. 6, the components within the header body 132, such as the antenna 128 and the sensing electrode 126 are shown in phantom.

The header 120 in the illustrated embodiment has a semicircular or D-shaped perimeter around the faces 138, 140. The perimeter is defined by the mounting end 124 and the curved distal surface 142. The shape provides a smooth contour along the end of the IMD 100. FIG. 6 shows that the header 120 has a generally rectangular shape when viewed in profile. The header 120 may have other shapes in other embodiments.

The sensing electrode 126 according to the embodiments disclosed herein is designed to have exposed sections along multiple different sides of the header 120. For this reason, the electrode 126 is referred to as a multi-sided header electrode. By positioning the electrode 126 along multiple sides of the header 120, the overall surface area of the electrode 126 that is able to contact the tissue of the patient can be increased relative to positioning the electrode 126 only along one side of the header 120. The increased tissue-electrode contact surface area can provide more robust and accurate cardiac sensing, with reduced sensitivity to movements of the IMD 100 due to postural changes or the like. Furthermore, if the IMD 100 does rotate in the subcutaneous pocket due to patient movement such that one portion of the electrode 126 along one side of the header 120 loses contact with the tissue, another portion of the electrode 126 along a different side of the header 120 would likely sustain contact with the tissue, thereby reducing the risk of missing EGM signals and diagnosing a false pause episode.

With reference to FIGS. 3 through 6, the sensing electrode 126 includes at least a first body portion 144, a second body portion 146, and a bridge portion 148. The bridge portion 148 mechanically and electrically connects the first and second body portions 144, 146. The first and second body portions 144, 146 are spaced apart from each other and extend along different sides of the header 120. Each of the body portions 144, 146 is at least partially surrounded by and/or embedded in the header body 132, and also has a surface that is exposed to the external environment surrounding the IMD 100. For example, when implanted, the external environment includes organic tissues, such as fat and muscle, and fluids of the patient surrounding the IMD 100. The body portions 144, 146 are exposed to the external environment such that at least one surface of the respective body portion 144, 146 is not coated by the material of the header body 132 or otherwise encapsulated within the header 120, enabling the exposed surfaces to experience direct physical contact with the organic tissue of the patient to establish persistent electrode-tissue contact.

In the illustrated embodiment, the first body portion 144 is located along the first face 138 of the header 120, and the second body portion is located along the second face 140 of the header 120. As such, the two body portions 144, 146 of the electrode 126 are disposed along opposite sides of the header 120. A benefit of locating the body portions 144, 146 of the electrode 126 along both faces 138, 140 of the header 120 is that in the event of the IMD 100 rotating within the patient, one of the body portions 144, 146 will still generally face the patient's heart. For example, if the first body portion 144 was previously facing the heart, the IMD 100 may be calibrated to primarily use the first body portion 144 to monitor EGM signals from the heart. In the event that the IMD 100 rotates such that the first body portion 144 now faces away from the heart, the second body portion 146 may be pointed towards the heart. The controller in the electronics module 110 (FIG. 2) can then calibrate the IMD 100 to primarily use the second body portion 146 to monitor the EGM signals. If the electrode was only exposed along one side, if that side moves and faces away from the heart, the sensing capability and quality of the IMD 100 may suffer.

The bridge portion 148 is mechanically and electrically connected to both body portions 144, 146. The bridge portion 148 extends through an interior volume of the header body 132 from the first body portion 144 to the second body portion 146. In the illustrated embodiment, the bridge portion 148 snakes along a non-linear path between the body portions 144, 146. In an alternative embodiment, the bridge portion 148 may be linear or non-linear but more direct than the illustrated embodiment.

As shown in FIG. 3, the first body portion 144 includes a platform 150 and a flange 152 that extends from a perimeter of the platform 150. The flange 152 optionally may surround the entire perimeter of the platform 150. The platform 150 has an outer surface 156 that faces away from the header 120 (e.g., away from the antenna 128, the second body portion 146, and the bridge portion 148). The platform 150 protrudes outward relative to the header body 132, and the outer surface 156 is exposed to the external environment. The outer surface 156 may be planar. The plane of the outer surface 156 may be parallel to the first face 138 of the header 120, as defined by the header body 132. In an alternative embodiment, the outer surface 156, or at least a portion thereof, may be convex to bulge outward.

As shown in FIG. 4, the platform 150 may have a D-shaped or semicircular structure as defined by edges 154 of the outer surface 156. The size and shape of the first body portion 144 may be determined or selected based on available space along the header first face 138. For example, larger sizes may be preferrable if available to increase the surface area of the exposed outer surface 156. In an embodiment, the surface area of the outer surface 156 may represent at least 50% of a total surface area of the first face 138 of the header 120, such as at least 70% of the total surface area. The D or semicircular shape of the platform 150 conforms to the shape of the header 120. For example, the edges 154 include arcuate distal edges 154a that are disposed proximate to, and conform with, the curved distal surface 142 of the header 120. The distal edges 154a are slightly spaced apart from the curved distal surface 142 in the illustrated embodiment, but may extend to the edge of the curved distal surface 142 or along the curved distal surface 142 in another embodiment, as described herein. The edges 154 are beveled or rounded to avoid sharp angles that could damage or snag on patient tissue.

The second body portion 146 is structured similar to the first body portion 146 with a platform 160 and a flange 162 that extends from a perimeter of the platform 160. The platform 160 has an outer surface 166 that faces away from the header 120 (e.g., away from the antenna 128, the first body portion 144, and the bridge portion 148). The platform 160 protrudes outward relative to the header body 132, and the outer surface 166 is exposed to the external environment. The outer surface 166 may be planar. The plane of the outer surface 166 may be parallel to the second face 140 of the header 120, as defined by the header body 132. In the illustrated embodiment, the planar outer surface 156 of the first body portion 144 is parallel to the planar outer surface 166 of the second body portion 146, as shown in FIG. 6. In an alternative embodiment, the outer surface 166, or at least a portion thereof, may be convex to bulge outward.

As shown in FIG. 5, the platform 160 has a distal edge 164a that is similar in length and location proximate to the curved distal surface 142 as compared to the distal edge 154a of the platform 150. The distal edge 164a conforms to the shape of the curved distal surface 142. In the illustrated embodiment, the second body portion 146, and the platform 160 thereof, is smaller in total surface area than the first body portion 144. The smaller size may be due to space constraints. As shown in FIG. 6, the second face 140 of the header 120 may have an opening to provide a cavity 170 in which the sensing electrode 126 and the antenna 128 are interconnected to corresponding conductive elements, such as wires 168. In an alternative embodiment in which the space constraint is not present, the second body portion 146 may be the same size as the first body portion 144.

As shown in FIG. 6, the first face 138 of the header 120 is defined in part by the platform 150 of the first body portion 144 and in part by the header body 132. The platform 150 projects or protrudes beyond the header body 132 such that the outer surface 156 is stepped or raised relative to the surface of the header body 132 along the first face 138 surrounding the platform 150. The second face 140 of the header 120 is similarly defined in part by the platform 160 and the header body 132, and the platform 160 similarly projects or protrudes outward relative to the header body 132. In the illustrated arrangement, the first and second body portions 144, 146 define raised electrode contact surfaces that at least partially project into the tissue of the patient when the header 120 abuts against the tissue. The raised platforms 150, 160 reduce the likelihood of the electrode 126 losing contact with the patient tissue, relative to electrode surfaces that are flush with the side of the header or recessed relative to the side of the header. In an alternative embodiment, the outer surfaces 156, 166 may be substantially flush with the first and second faces 138, 140 instead of raised and protruding outward from the faces 138, 140.

The antenna 128 according to at least one embodiment is fully contained or encapsulated within an interior volume of the header body 132 and the backfill material 134 that fills the cavity 170. For example, no portion of the antenna 128 is exposed to the external environment. The antenna 128 is disposed proximate to the curved distal surface 142. The antenna 128 may have an arcuate shape that generally conforms to the curved distal surface 142. The antenna 128 may be located between the first and second body portions 144, 146 of the sensing electrode 126, as shown in FIG. 6. The antenna 128 is electrically isolated from the components of the sensing electrode 126 via the material of the header body 132 to avoid interference and short circuits. Thus, although the antenna 128 appears to contact the bridge portion 148 in FIG. 6, the antenna 128 is actually discrete and spaced apart from the bridge portion 148. The size, shape, and placement of the antenna 128 in the header body 132 may vary according to design preferences. In an alternative embodiment, the antenna 128 may be exposed to the external environment along the curved outer surface 142 of the header body 132.

In at least one embodiment, the sensing electrode 126 and the antenna 128 are embedded within the material of the header body 132 by overmolding the electrode 126 and the antenna 128. The header body 132 may be composed of a dielectric material, such as a thermoplastic elastomer, an epoxy, a silicone, or the like. The dielectric material provides electrical insulation between the electrically conductive antenna 128 and sensing electrode 126. The dielectric material of the header body 132 is also selected to be biocompatible with the organic tissue of the patient.

An example assembly process for the header 120 includes inserting the sensing electrode 126 and the antenna 128 into a mold, and then pouring the dielectric material of the header body 132 in a heated, flowable (e.g., liquid or quasi-liquid) state into the mold to surround and contact the surfaces of the components. As the dielectric material cools and solidifies, the header body 132 forms. The interior volume of the header body 132 conforms to the shapes of the conductive components to embed the components. Once the dielectric material solidifies to form the header body 132, a preassembled header 120 is produced. The preassembled header 120 can be mounted to the device housing 102 to form the IMD 100 by first electrically connecting the antenna 128 and the sensing electrode 126 to the electronics module 110, optionally via the feedthrough assembly 118. Then, after the electrical connections are made, the backfill or potting material 134 is applied to fill in the cavity 170 of the header body 132. The final steps may include securing the header 120 to the device housing 102 and sealing the interface between the header 120 and the device housing 102 to provide a hermetic seal.

Figure 7:
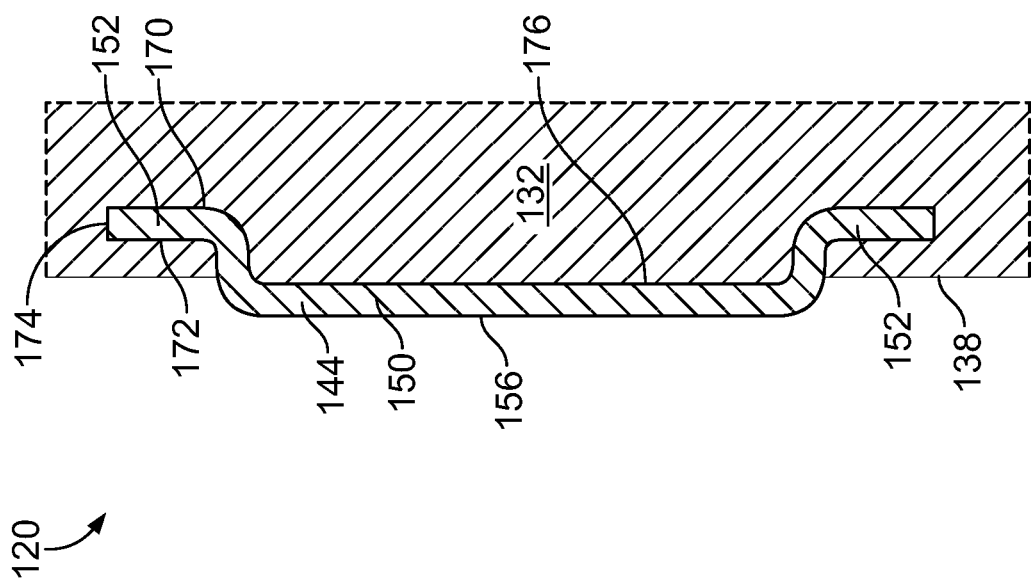
FIG. 7 is a cross-sectional view of a portion of the header showing a first body portion of a sensing electrode.

FIG. 7 is a cross-sectional view of a portion of the header 120 showing the first body portion 144 of the sensing electrode 126. The cross-section may bisect the first body portion 144. In an embodiment, the first body portion 144 is embedded in the dielectric material of the header body 132 such that the dielectric material envelops the flange 152. For example, the dielectric material of the header body 132 engages both an inner surface 170 and an outer surface 172 of the flange 152, as well as a perimeter end 174 of the flange 152. Upon solidifying, the head body 132 secures the first body portion 144 in a fixed position. The dielectric material may also contact an inner surface 176 of the platform 150 that is opposite the outer surface 156. The platform 150 projects beyond the portion of the first face 138 defined by the header body 132, and the outer surface 156 is exposed to the external environment to establish sustained contact with patient tissue.

Figure 8:
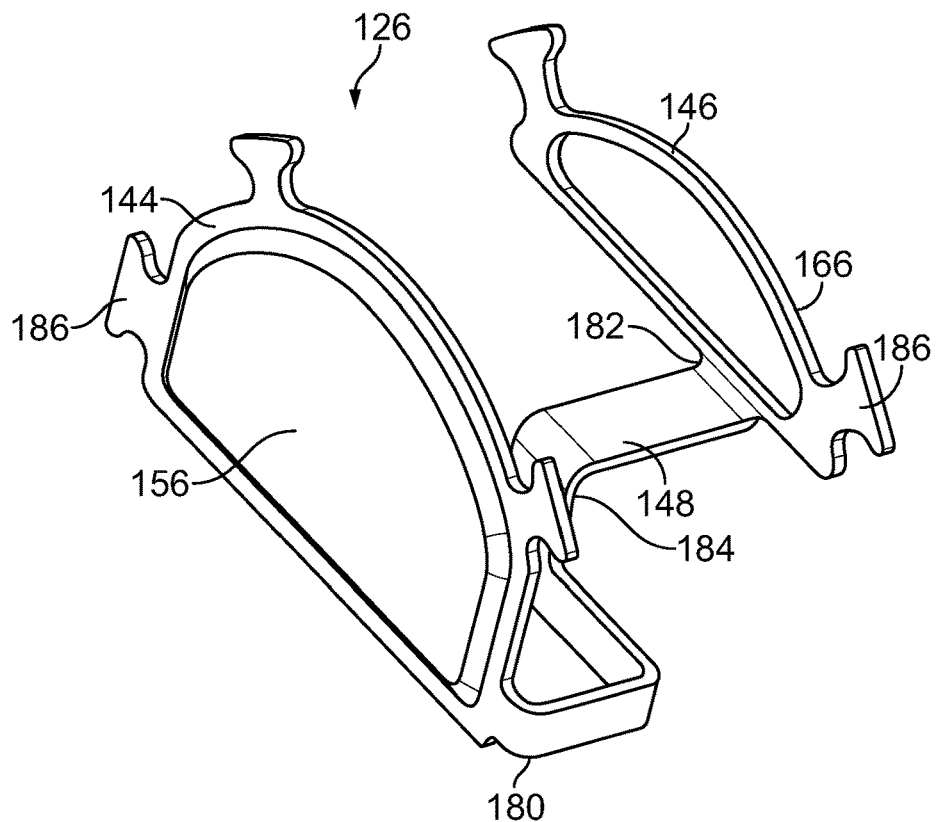
FIG. 8 is a first perspective view of the sensing electrode according to the embodiment shown in FIGS. 3 through 7.
Figure 9:
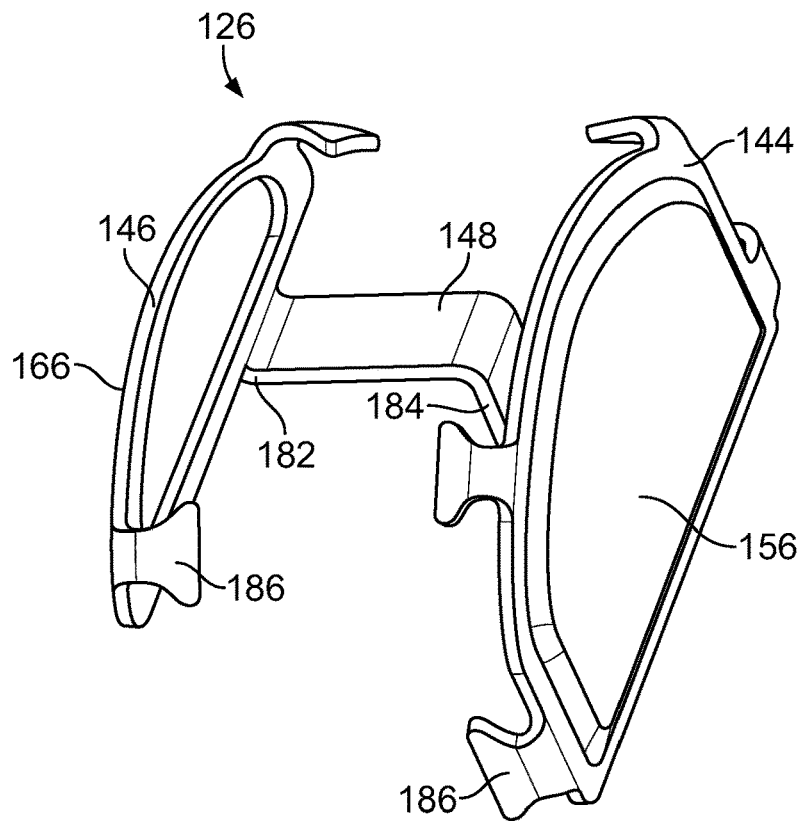
FIG. 9 is a second perspective view of the sensing electrode shown in FIG. 8.

FIG. 8 is a first perspective view of the sensing electrode 126 according to the embodiment shown in FIGS. 3 through 7. FIG. 9 is a second perspective view of the sensing electrode 126 shown in FIG. 8. The sensing electrode 126 may be a monolithic (e.g., one-piece) structure such that the first body portion 144 and the second body portion 146 are integrally connected to the bridge portion 148. The first body portion 144 is seamlessly connected to a first end 180 of the bridge portion 148, and the second body portion 146 is seamlessly connected to a second end 182 of the bridge portion 148. In an embodiment, the second electrode 126 is a stamped and formed metal element. For example, the first and second body portions 144, 146 and the bridge portion 148 may be stamped out of a metal sheet and then bent and formed into the shape shown in FIGS. 8 and 9 without separating the components 144, 146, 148. The second electrode 126 is electrically conductive, and the bridge portion 148 electrically and mechanically connects the first body portion 144 to the second body portion 146. As such, the sensing electrode 126 is a single electrode with multiple, spaced-apart tissue contacting surfaces, as opposed to two discrete electrodes. For example, the first and second body portions 144, 146 are not merely two different electrodes that are at the same electrical potential, but rather are two portions of a monolithic structure.

In an embodiment, a segment of the bridge portion 148 is utilized as an interconnect panel 184 for electrically connecting the sensing electrode 126 to a conductive element that projects through the mounting end 124 of the header 120 to electrically connect the sensing electrode 126 to the electronics module 110. For example, as shown in FIG. 6, a wire 168 may be welded, crimped, bonded, or otherwise secured to the interconnect panel 184 of the bridge portion 148.

Optionally, the first and second body portions 144, 146 of the sensing electrode 126 include bent tabs 186 along respective perimeters thereof. The bent tabs 186 may be flared. The tabs 186 are bent out of the plane of the outer surfaces 156, 166, as shown in FIG. 9, and project into an interior of the header 120. FIG. 8 shows the tabs 186 prior to being bent out of plane. The tabs 186 are used to anchor the sensing electrode 126 in place relative to the header body 132. For example, the tabs 186 may be encased within the dielectric material of the header body 132 during an overmold process.

Figure 10:
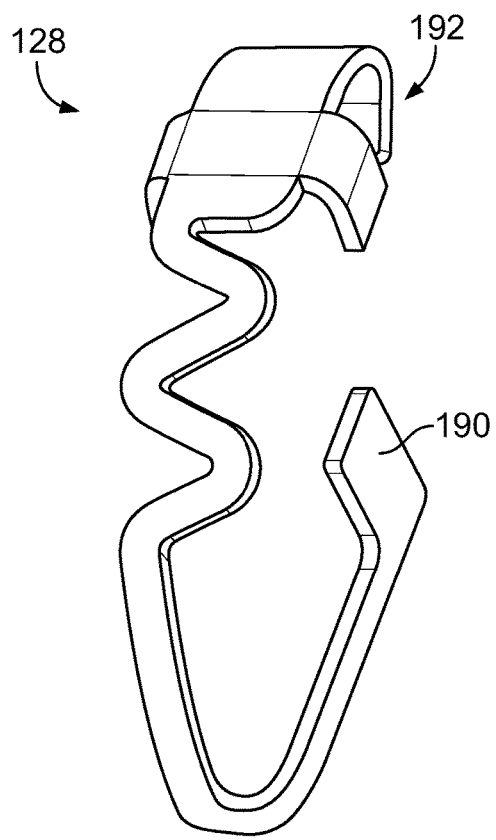
FIG. 10 is a perspective view of an antenna of the header according to an embodiment.

FIG. 10 is a perspective view of the antenna 128 of the header 120 according to an embodiment. The antenna 128 has a monolithic structure that extends from an interconnect panel 190 to a distal end 192. The interconnect panel 190 is configured to secure to a conductor that projects from the mounting end 124 of the header 120 into the device housing 102. The antenna 128 may have various sizes and shapes in different embodiments.

Figure 11:
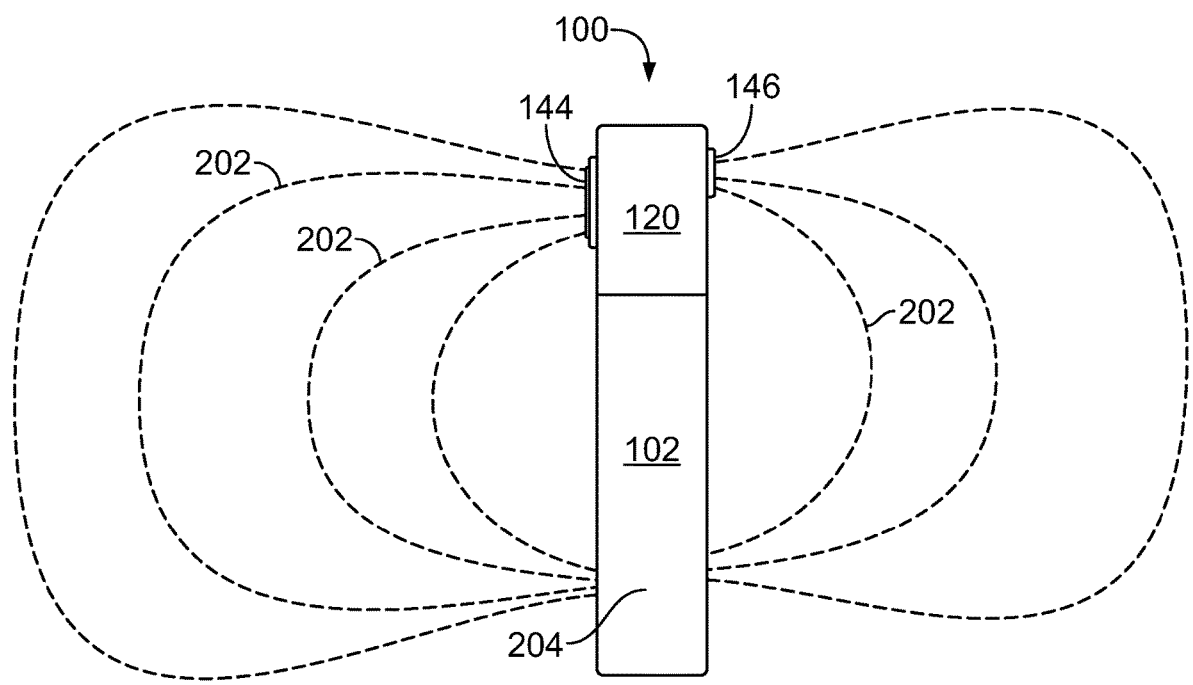
FIG. 11 illustrates a profile view of the IMD shown in FIGS. 3 through 10 in operation.

FIG. 11 illustrates a profile view of the IMD 100 shown in FIGS. 3 through 10 in operation. The IMD 100 may utilize sensing vectors 202 between multiple electrodes to monitor the electrical activity of the heart. For example, the sensing electrode 126 in the header 120 represents a first electrode. The device housing 102 includes or represents a housing electrode 204. For example, the device housing 102 may have an electrically conductive case or shell that functions as the housing electrode 204, or the device housing 102 may include a discrete electrode mounted to or along an exterior surface of the housing 102. The sensing electrode 126 may be a positive electrode, or cathode, and the housing electrode 204 may be a negative electrode, or anode. Alternatively, the sensing electrode 126 may function as an anode, and the housing electrode 204 may function as a cathode. The sensing vectors 202 are emitted from one of the electrodes 126, 204 and travel through the patient tissue and/or fluid in the external environment before returning to the other electrode 126, 204. The electronics module 110 analyses the received sensing vectors 202 to detect modifications in the sensing vectors 202 attributable to cardiac activity. Because the sensing electrode 126 is multi-sided, the sensing vectors 202 can extend from the IMD 100 along multiple directions, resulting in more robust cardiac sensing.

Figure 12:
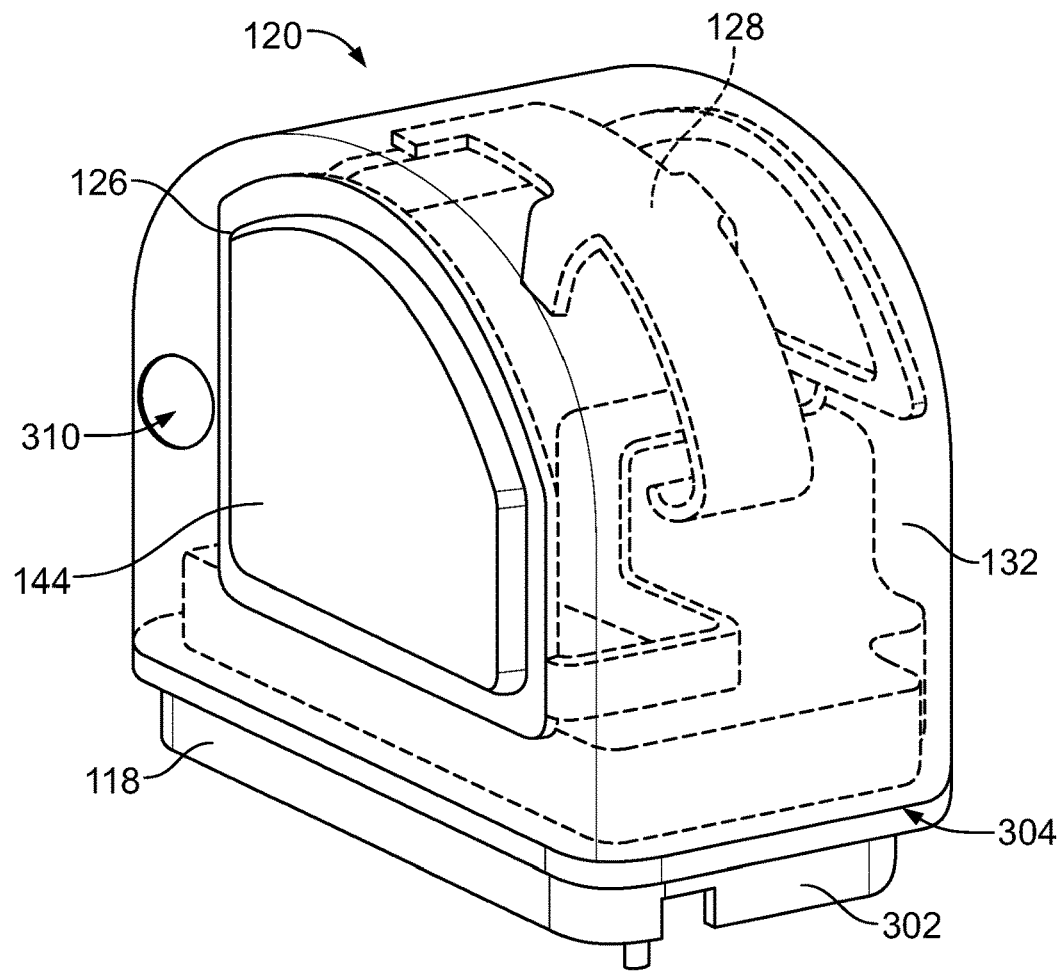
FIG. 12 is a perspective view of the header of the IMD according to a second embodiment.
Figure 13:
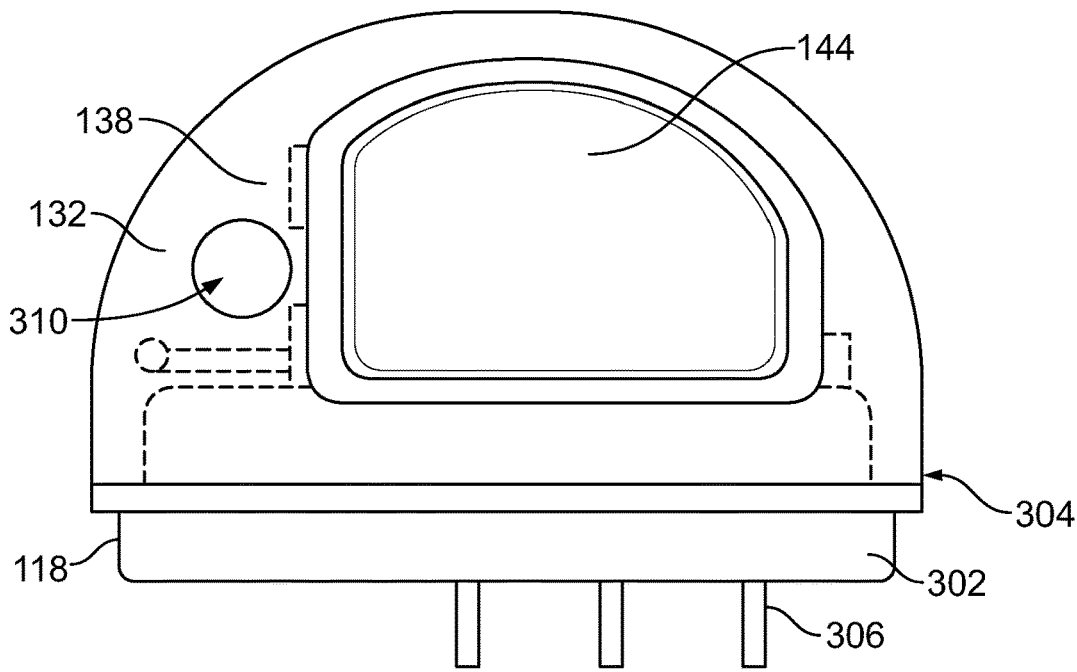
FIG. 13 is an elevation view of the header in FIG. 12 showing the first face 138.
Figure 14:
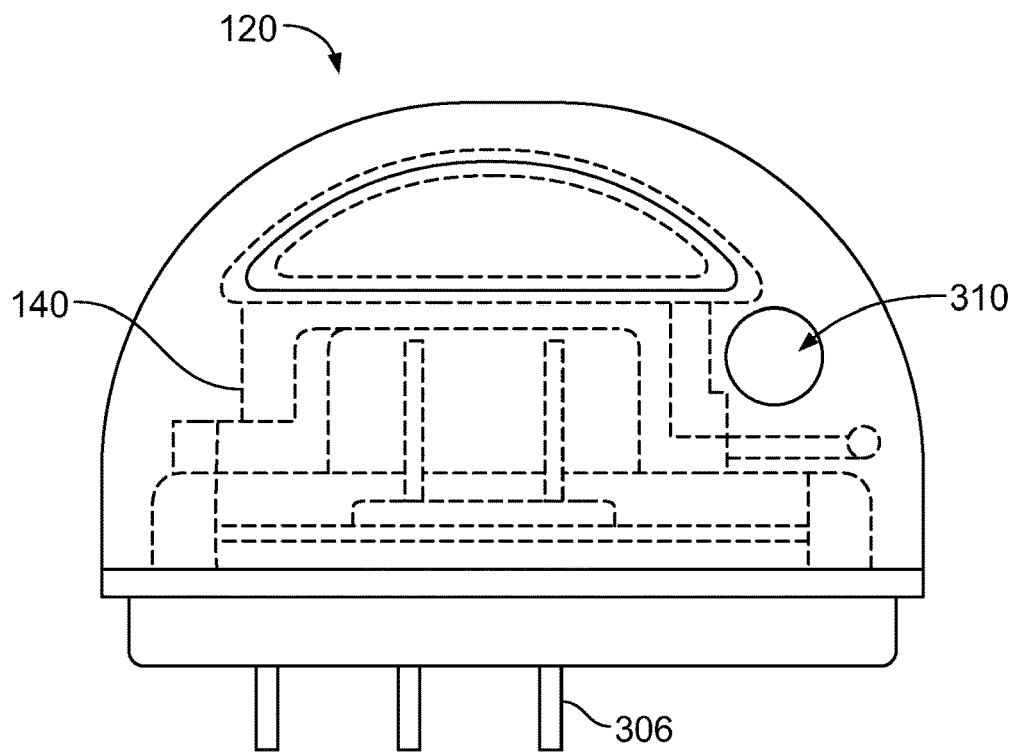
FIG. 14 is an elevation view of the header in FIGS. 12 and 13 showing the second face.

FIG. 12 is a perspective view of the header 120 of the IMD 100 according to a second embodiment. FIG. 13 is an elevation view of the header 120 in FIG. 12 showing the first face 138. FIG. 14 is an elevation view of the header 120 in FIGS. 12 and 13 showing the second face 140. In the illustrated embodiment, the header 120 is shown mounted to the feedthrough assembly 118. For example, the feedthrough assembly 118 has a base 302 that abuts the mounting end 124 of the header 120 at an interface 304. A segment of the base 302 outside of the header 120 is configured to attach to the end 130 of the device housing 102. FIGS. 13 and 14 show multiple conductors 306 that extend through the base 302 of the feedthrough assembly 118 into the header 120 to electrically connect to the sensing electrode 126 and the antenna 128.

The header 120 in FIGS. 12 through 14 differs from the header 120 shown in FIGS. 3 through 11 because the header body 132 defines a suture opening 310. The suture opening 310 extends through an entire thickness of the header body 132 from the first face 138 to the second face 140. The suture opening 310 is provided to enable anchoring the IMD 100, via the header 120, to the patient tissue. For example, a suture may be provided through the suture opening 310 into a piece of tissue to tether the IMD 100 to that tissue. In the illustrated embodiment, the first body portion 144 of the sensing electrode 126 is narrowed or truncated to provide space for the suture opening 310.

Figure 15:
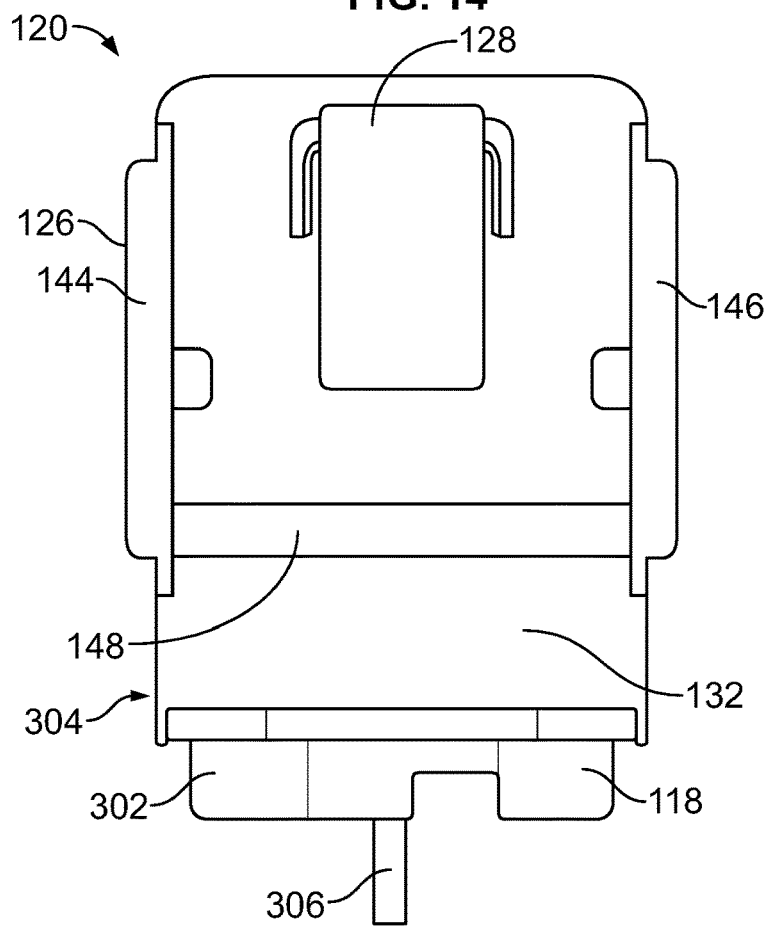
FIG. 15 illustrates a profile view of the header according to another embodiment of the present disclosure.

FIG. 15 illustrates a profile view of the header 120 according to another embodiment of the present disclosure. In FIG. 15, the header 120 lacks the backfill or potting material 134 shown in FIG. 3. For example, the header 120 includes the sensing electrode 126, the antenna 128, and the header body 132. In the illustrated embodiment, the header body 132 is overmolded in-situ on the base 302 of the feedthrough assembly 118. An exemplary assembly process may include electrically connecting the antenna 128 and the sensing electrode 126 to corresponding conductors 306 of the feedthrough assembly 118. The antenna 128, sensing electrode 126, and even a portion of the base 302 are then inserted into a mold, and the dielectric material is flowed into the mold to form around the components. The dielectric material solidifies to form the header body 132, as described above. In this example, the dielectric material surrounds at least a portion of the base 302, so the header body 132 when formed effectively covers the interface 304 between the header 120 and the feedthrough assembly 118. In essence, the header 120 forms in-situ on the feedthrough assembly 118.

In this embodiment, there is no need to define an interconnect cavity or opening for later backfilling, so there is space to increase the electrode surface area. For example, in FIG. 15 the second body portion 146 of the sensing electrode 126 is larger than the second body portion 146 in previously described embodiments. The second body portion 146 in FIG. 15 may have the same size and shape as the first body portion 144. Furthermore, the bridge portion 148 may extend linearly across the thickness of the header body 132 between the first and second body portions 144, 146. Increasing the exposed surface area of the sensing electrode 126 can increase the robustness, reliability, and sensing accuracy of the IMD 100 relative to having less exposed electrode surface area.

Figure 16:
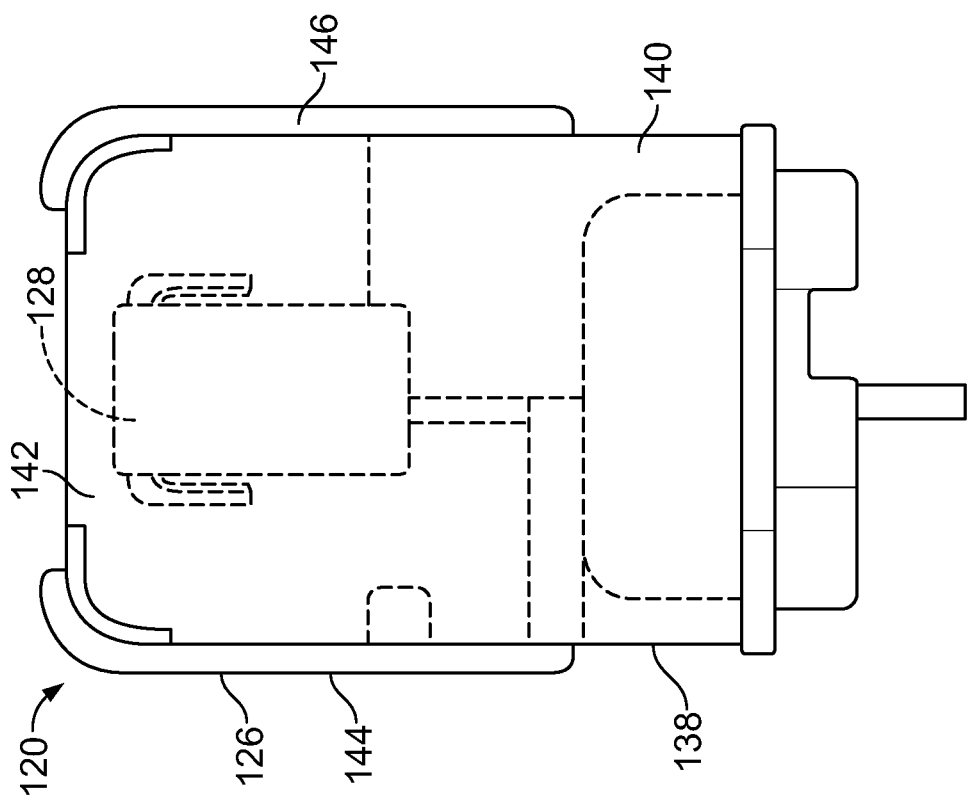
FIG. 16 illustrates a profile view of the header according to another embodiment of the present disclosure.

FIG. 16 illustrates a profile view of the header 120 according to another embodiment of the present disclosure. FIG. 16 is similar to the embodiment in FIG. 15, except that the first body portion 144 and the second body portion 146 each extend at least partially along the curved distal surface 142 of the header 120. For example, the first body portion 144 extends along the first face 138 and also extends along a portion of the curved distal surface 142. Similarly, the second body portion 144 extends along both the second face 140 and the curved distal surface 142. Neither of the body portions 144, 146 extends directly above the antenna 128, so may not interfere with communications transmitted or received by the antenna 128. Extending the sensing electrode 126 over the edge along the curved distal surface 142 enables the sensing electrode 126 to increase the total amount of exposed surface area for contacting the patient tissue, and also enables the sensing electrode 126 to face in a direction that is generally orthogonal to the directions faced by the body portions 144, 146 along the first and second faces 138, 140.

Figure 17:
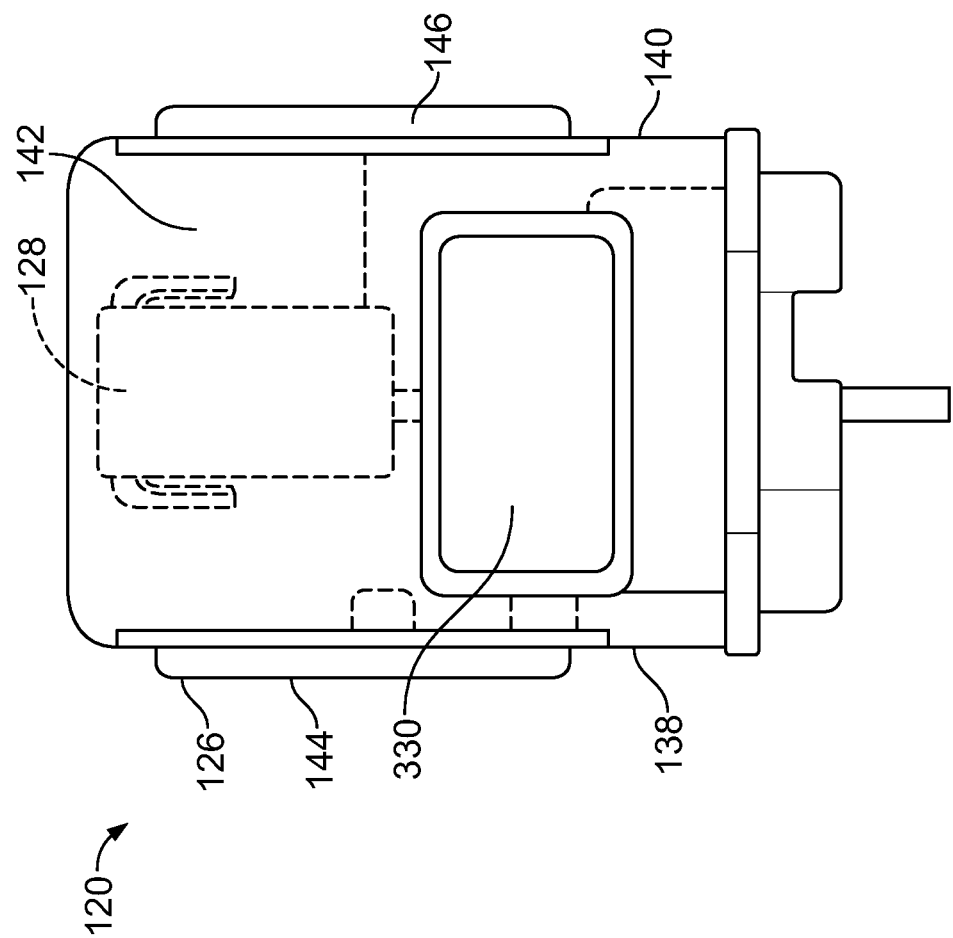
FIG. 17 illustrates a profile view of the header according to yet another embodiment of the present disclosure.

FIG. 17 illustrates a profile view of the header 120 according to yet another embodiment of the present disclosure. In FIG. 17, the sensing electrode 126 includes the first body portion 144 exposed along the first face 138, the second body portion 146 exposed along the second face 140, as previously described, and also includes a third body portion 330 exposed along the curved distal surface 142. The third body portion 330 is mechanically and electrically connected to the bridge portion 148. The third body portion 330 is spaced apart from the antenna 128 to avoid interfering with the communications of the antenna 128. The sensing electrode 126 in the illustrated embodiment is tri-sided with exposed segments of the electrode 126 located along three different sides of the header 120. The sensing electrode 126 may include more than three body portions in other embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An implantable medical device comprising:
    a header configured to be mounted to an end of a device housing that contains an electronics module therein, the header comprising an antenna, a sensing electrode, and a header body that at least partially surrounds the antenna and the sensing electrode,
    wherein the sensing electrode comprises a first body portion, a second body portion, and a bridge portion that mechanically and electrically connects the first and second body portions, the first body portion at least partially exposed to an external environment along a first side of the header and the second body portion at least partially exposed to the external environment along a second side of the header that is different from the first side, wherein the bridge portion is disposed within and extends through an interior volume of the header body.

2. The implantable medical device of claim 1, wherein the first side of the header is opposite the second side of the header.

3. The implantable medical device of claim 1, wherein the first side of the header is defined in part by the header body and in part by the first body portion of the sensing electrode, wherein the part of the first side defined by the first body portion protrudes outward relative to the part defined by the header body.

4. The implantable medical device of claim 1, wherein each of the first body portion and the second body portion has a respective flange and a platform that is raised relative to the flange, wherein the header body envelops the flange and an outer surface of the platform projects from the header body.

5. The implantable medical device of claim 4, wherein perimeter edges of the platform are one of beveled or rounded.

6. The implantable medical device of claim 1, wherein the header body comprises a dielectric material in which the antenna and the sensing electrode are embedded.

7. The implantable medical device of claim 1, wherein the header includes a curved distal surface extending along a thickness of the header from the first side to the second side, and respective distal edges of the first body portion and the second body portion are arcuate and conform to a shape of the curved distal surface.

8. The implantable medical device of claim 1, wherein the sensing electrode is a monolithic structure and the first body portion and the second body portion are integrally connected to different ends of the bridge portion.

9. The implantable medical device of claim 1, wherein the header body defines a suture opening that extends through an entire thickness of the header body.

10. The implantable medical device of claim 1, wherein each of the first body portion and the second body portion has bent tabs projecting into the interior volume of the header body and encased within the header body to secure the first and second body portions in place within the header.

11. The implantable medical device of claim 1, further comprising a feedthrough assembly that abuts a mounting end of the header at an interface and attaches to the end of the device housing, wherein the header body comprises a dielectric material that covers the interface and surrounds at least a segment of the feedthrough assembly.

12. The implantable medical device of claim 1, wherein the bridge portion of the sensing electrode is mechanically attached to a conductor to electrically connect the conductor to the sensing electrode, wherein the conductor projects from a mounding end of the header through the end of the device housing to the electronics module.

13. The implantable medical device of claim 1, wherein the first body portion has a planar outer surface that is exposed to the external environment and the second body portion has a planar outer surface that is exposed to the external environment, wherein the planar outer surfaces of the first and second body portions extend in parallel planes.

14. The implantable medical device of claim 1, wherein the first body portion of the sensing electrode is spaced apart from the second body portion of the sensing electrode along an exterior surface of the header by a portion of the header body.

15. An implantable medical device comprising:
a header configured to be mounted to an end of a device housing that contains an electronics module therein, the header comprising an antenna, a sensing electrode, and a header body,
wherein the sensing electrode comprises a first body portion, a second body portion, and a bridge portion that mechanically and electrically connects the first and second body portions, the bridge portion disposed within and extending through an interior volume of the header body, wherein each of the first body portion and the second body portion has a respective flange and a respective platform that is raised relative to the flange, and the header body envelops the flanges of both the first and second body portions,
wherein the platform of the first body portion protrudes outward beyond the header body along a first side of the header and an outer surface of the platform of the first body portion is exposed to an external environment, and the platform of the second body portion protrudes outward beyond the header body along a second side of the header and an outer surface of the platform of the second body portion is exposed to the external environment.

16. The implantable medical device of claim 15, wherein the first side of the header is opposite the second side.

17. The implantable medical device of claim 15, wherein the sensing electrode is a monolithic structure and the first body portion and the second body portion are integrally connected to different ends of the bridge portion.

* * * * *